US011313722B2

(12) United States Patent
Scherer et al.

(10) Patent No.: US 11,313,722 B2
(45) Date of Patent: Apr. 26, 2022

(54) INFRARED SPECTROMETER HAVING DIELECTRIC-POLYMER-BASED SPECTRAL FILTER

(71) Applicant: California Institute of Technology, Pasadena, CA (US)

(72) Inventors: Axel Scherer, Barnard, VT (US); Taeyoon Jeon, Pasadena, CA (US); Jieun Myung, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 17/093,211

(22) Filed: Nov. 9, 2020

(65) Prior Publication Data

US 2021/0140817 A1    May 13, 2021

Related U.S. Application Data

(60) Provisional application No. 62/940,699, filed on Nov. 26, 2019, provisional application No. 62/932,632, filed on Nov. 8, 2019.

(51) Int. Cl.
*G01J 3/12* (2006.01)
*G01J 3/10* (2006.01)
(Continued)

(52) U.S. Cl.
CPC ............... *G01J 3/12* (2013.01); *G01J 3/0259* (2013.01); *G01J 3/108* (2013.01); *G01J 3/26* (2013.01);
(Continued)

(58) Field of Classification Search
CPC ....... G01J 2003/1226; G01J 2003/1234; G01J 2003/1282; G01J 3/0259; G01J 3/108; G01J 3/12; G01J 3/26
See application file for complete search history.

(56) References Cited

U.S. PATENT DOCUMENTS

| 5,144,498 | A | 9/1992 | Vincent |
| 5,550,373 | A | 8/1996 | Cole et al. |

(Continued)

FOREIGN PATENT DOCUMENTS

| WO | 1989/005465 | 6/1989 |
| WO | 02/24570 A1 | 3/2002 |

(Continued)

OTHER PUBLICATIONS

A. Piegar et al., "Thin-film graded optical filters for mini-spectrometers", "Proceedings of SPIE", Event: ROMOPTO 2006: Eighth Conference on Optics, 2006, Sibiu, Romania, Aug. 1, 2007, doi: 10.1117/12.756739, 8 pp., vol. 6785, https://www.spiedigitallibrary.org/conference-proceedings-of-spie.

(Continued)

*Primary Examiner* — Mark R Gaworecki
(74) *Attorney, Agent, or Firm* — Kaplan Breyer Schwarz, LLP

(57) ABSTRACT

An infrared spectrometer for operation in the mid-infrared spectral range is disclosed, where the spectrometer includes a Bragg-mirror-based spectral filter that is operative for providing an output optical signal whose spectral content is spatially dispersed along a first direction, where the Bragg mirrors include low-refractive-index layers comprising a polymer material that is transmissive across the mid-infrared spectral range and is characterized by less than ten absorption peaks with the operating spectral range of the spectrometer.

20 Claims, 16 Drawing Sheets

(51) Int. Cl.
*G01J 3/02* (2006.01)
*G01J 3/26* (2006.01)
(52) U.S. Cl.
CPC ............... *G01J 2003/1226* (2013.01); *G01J 2003/1234* (2013.01); *G01J 2003/1282* (2013.01)

(56) References Cited

U.S. PATENT DOCUMENTS

| | | | |
|---|---|---|---|
| 5,674,457 | A | 10/1997 | Williamsson et al. |
| 5,777,329 | A | 7/1998 | Westphal et al. |
| 5,801,057 | A | 9/1998 | Smart et al. |
| 5,818,588 | A | 10/1998 | Matsumoto et al. |
| 6,243,170 | B1 | 6/2001 | Ershov |
| 6,597,490 | B2 | 7/2003 | Tayebati |
| 6,785,002 | B2 | 8/2004 | Zarrabian et al. |
| 7,304,798 | B2 | 12/2007 | Izumi et al. |
| 7,817,281 | B2 | 10/2010 | Kiesel et al. |
| 8,174,394 | B2 | 5/2012 | Ridder et al. |
| 8,406,859 | B2 | 3/2013 | Zuzak et al. |
| 8,649,097 | B2 | 2/2014 | Mitamura |
| 8,854,624 | B2 | 10/2014 | Pervez et al. |
| 9,230,856 | B2 | 1/2016 | Yeh et al. |
| 9,268,144 | B2 | 2/2016 | Rissanen et al. |
| 9,638,913 | B2 | 5/2017 | Kamal et al. |
| 11,085,825 | B2 | 8/2021 | Medhat et al. |
| 2002/0033453 | A1 | 3/2002 | Sauer et al. |
| 2003/0171696 | A1 | 9/2003 | Dosmann |
| 2003/0212346 | A1 | 11/2003 | Yuzhakov et al. |
| 2004/0136076 | A1 | 7/2004 | Tayebati |
| 2006/0039009 | A1 | 2/2006 | Kiesel et al. |
| 2006/0144335 | A1 | 7/2006 | Lee et al. |
| 2006/0182659 | A1 | 8/2006 | Unlu et al. |
| 2007/0148760 | A1 | 6/2007 | Kiesel et al. |
| 2008/0080034 | A1 | 4/2008 | Saadany et al. |
| 2008/0094620 | A1 | 4/2008 | Li et al. |
| 2010/0032298 | A1 | 2/2010 | Reel et al. |
| 2010/0097613 | A1 | 4/2010 | Saari |
| 2012/0122084 | A1 | 5/2012 | Wagner et al. |
| 2012/0307081 | A1 | 12/2012 | Dewald et al. |
| 2013/0235256 | A1 | 9/2013 | Kodama |
| 2014/0219886 | A1 | 8/2014 | Choi et al. |
| 2014/0253714 | A1 | 9/2014 | Weida et al. |
| 2014/0268127 | A1 | 9/2014 | Day |
| 2015/0136981 | A1 | 5/2015 | Kester et al. |
| 2015/0138533 | A1 | 5/2015 | Bolles et al. |
| 2015/0331109 | A1 | 11/2015 | Christensen et al. |
| 2016/0202178 | A1 | 7/2016 | Acosta et al. |
| 2020/0249091 | A1 | 8/2020 | Scherer et al. |

FOREIGN PATENT DOCUMENTS

| | | |
|---|---|---|
| WO | 2005/124951 A1 | 12/2005 |
| WO | 2009/039354 | 3/2009 |
| WO | 2015/003759 A1 | 1/2015 |
| WO | 2016/176735 A1 | 11/2016 |

OTHER PUBLICATIONS

Jesse A. Frantz et al., "Chip-based nonmechanical beam steerer in the midwave infrared", "Journal of the Optical Society of America", Nov. 5, 2018, Optical Society of America, pp. C29-C37, vol. 35, No. 12.

Leonid M. Goldenberg et al., "Fast and simple fabrication of organic Bragg mirrors—application to plastic microchip lasers", "Laser Physics Letters", Apr. 10, 2013, Astro Ltd, doi:10.1088/1612-2011/10/5/055808, 8 pp., https://iopscience.iop.org/article/10.1088/1612-2011/10/5/055808.

Paola Lova, "Selective Polymer Distributed Bragg Reflector Vapor Sensors", "Polymers", Oct. 17, 2018, doi:10.3390/polym10101161, 9 pp.

Authorized Officer Blaine Copenheaver, International Search Report and Written Opinion dated Apr. 24, 2020 in PCT Patent Application No. PCT/US2020/016819.

Authorized Officer Lee W. Young, International Search Report and Written Opinion dated Aug. 27, 2018 in International PCT Application No. PCT/US2018/034710.

Authorized Officer: Sung Chul Kang, "International Search Report" issued in counterpart International Patent Application No. PCT/US2016/021629, dated Jun. 17, 2016, Publisher: PCT, Published in: WO.

Dolgin et al., "New Technology Report: Micromachined Optical Systems", Jun. 13, 1994, Jet Propulsion Laboratory.

Dolgin et al., "New Technology Report: Micromachined Tunable Filters for Optical Applications", Jun. 1, 1994, Jet Propulsion Laboratory.

Ford et al., 'Interference-Based Micromechanical Spectral Equalizers', Oct. 16, 2003, IEEE JSTQE on Optical Microsystems, pp. 1-8.

Ghaderi et al., 'Vapour HF release of airgap-based UV-visible optical filters', © 2015 Published by Elsevier Ltd.; Procedia Engineering 120 (2015), pp. 816-819.

International Search Report and Written Opinion issued in PCT Patent Application No. PCT/US2020/059723 dated Feb. 2, 2021.

Non-Final Rejection received for U.S. Appl. No. 15/990,114, dated Apr. 18, 2019, 23 pages.

Notice of Allowance received for U.S. Appl. No. 15/990,114, dated Sep. 23, 2019, 7 pages.

Prott et al., 'Modeling of Ultrawidely Tunable Vertical Cavity Air-Gap Filters and VCSELs', Jun. 19, 2003, IEEE Journal of Selected Topics in Quantum Electronics;, pp. 918-928, vol. 9/ Issue No. 3.

Streubel et al., 'Fabrication of InP/air-gap distributed Bragg reflectors and microcavities', Feb. 1997; Elsevier; Materials Science and Engineering: B, pp. 364-367, vol. 44 / Issues 1-3, https://doi.org/10.1016/S0921-5107(96)01743-6.

Non-Final Office Action dated Sep. 10, 2021 for U.S. Appl. No. 16/782,674.

Notice of Allowance and Fees Due (PTOL-85) dated Jan. 13, 2022 for U.S. Appl. No. 16/782,674.

INFRARED SPECTROMETER HAVING DIELECTRIC-POLYMER-BASED SPECTRAL FILTER

CROSS-REFERENCE TO RELATED APPLICATIONS

This application claims the benefit of U.S. Provisional Application Nos. 62/932,632, filed Nov. 8, 2019 and 62/940,699, filed Nov. 26, 2019, each of which is incorporated herein by reference.

FIELD OF THE INVENTION

The present invention relates to spectral filters and, more particularly, to spectral filters suitable for use in hyperspectral detectors and imaging systems.

BACKGROUND OF THE INVENTION

Infrared spectroscopy enables analysis of the chemical makeup of a sample by interrogating the material with radiation within a spectral range and determining absorption spectrum of the material of the sample over those wavelengths. Infrared spectroscopy is attractive for use in many applications, such as medical diagnostics, petroleum exploration, environmental monitoring, and drug testing.

Every chemical and compound has a unique absorption spectrum, which manifests as a specific set of wavelengths at which radiation is measurably absorbed to create a set of "absorption peaks." As a result, the absorption peaks identified for the material of a sample provide a chemical "fingerprint" that enables its chemical makeup to be determined. The mid-infrared (MIR) and long-wavelength infrared (LWIR) spectral ranges are particularly attractive for spectroscopy because they normally include a wealth of absorption peaks for most chemicals. In fact, the MIR spectral range, in particular, is often referred to as the "fingerprint region" for most molecules.

Unfortunately, prior-art spectrometers are large, highly complex, and costly due to the fact that they require long propagation lengths for the radiation and precisely aligned optical components, such as mirrors and beam splitters, whose alignment must be maintained. Efforts to miniaturize spectrometers and reduce their complexity have been made; however, these approaches still typically require the fabrication and alignment of a number of precisely controlled structures to obtain the desired optical properties.

Furthermore, operation in the MIR and LWIR spectral ranges gives rise to additional challenges due to the fact that the set of materials suitable for use in optical components operable at these wavelengths is limited and such materials are often prohibitively expensive.

As a result, to date, conventional infrared spectrometers for operation in the MIR and/or LWIR spectral ranges remain quite large and complex. In addition, they often suffer from narrow bandwidth or wavelength resolution that is too coarse to effectively identify many chemicals and compounds.

SUMMARY

An advance is made in the art according to aspects of the present disclosure directed to infrared spectrometers having spectral filters based on Bragg-mirror-based Fabry-Perot cavities, where the Bragg mirrors comprise a low-cost polymer material having high optical performance within a spectral range of interest. Embodiments disclosed herein are particularly suitable for use in infrared spectrometers intended for operation in the mid-infrared and/or longwave infrared spectral ranges. Bragg-mirrors in accordance with the present disclosure include one or more polymer layers that function as low-refractive-index materials over the spectral range of interest. Embodiments of the present invention are particularly well suited for use in hyperspectral imaging systems, hyperspectral detection systems, and high-resolution spectrometers.

Like the prior art, spectral filters in accordance with the present disclosure comprise a Fabry-Perot (FP) cavity having a pair of Bragg-reflector-based mirrors whose separation changes linearly along one direction giving rise to a cavity length that varies linearly along that direction.

In contrast to the prior art, however, infrared spectrometers in accordance with the present disclosure employ Bragg mirrors whose low-index-material layers are made of a polymer that is preferably characterized by fewer than ten absorption peaks within the operational spectral range of the system. As a result, Bragg mirrors taught herein can have higher reflectivity, larger free-spectral range, and lower scatter and absorption losses than are possible in the prior art. In addition, the use of a polymer having at least one absorption peak enables the use of that absorption peak as an absolute wavelength reference that can be used for calibration.

An illustrative embodiment is an infrared spectrometer operative for interrogating a sample with a radiation signal having an operational spectral range that is within the MIR spectral range. The system includes a source of interrogating radiation, a spectral filter, and a linear array of bolometers that function as detector elements, where the optical path between the source and bolometers passes through a test sample and the spectral filter. As a result, the wavelength signals received from the sample are spatially dispersed along the longitudinal axis of the linear array of bolometers such that each bolometer selectively receives a different one of the wavelength signals.

The spectral filter is a Bragg-mirror-based Fabry-Perot cavity whose mirrors are separated by linearly increasing distance along a first axis that is aligned with the bolometer array. Each Bragg mirror includes a pair of high-refractive-index layers located on either side of a low-refractive-index layer comprising a polymer, where the thickness of each high-refractive-index layer and the low-refractive-index layer is substantially uniform and equal to approximately one-quarter of the center wavelength of the operating spectral range of the spectrometer. In the illustrative embodiment, the high-refractive-index material is germanium and the low-refractive-index material is polyethylene.

The Bragg mirrors are separated by a central layer of low-refractive-index material whose thickness increases linearly along the first axis from a first thickness at the first detector in the detector array to a second thickness at the last detector in the detector array. The first thickness is equal to half the wavelength of the center wavelength of the operational spectral range plus an integer multiple of half the wavelength of the shortest wavelength in the operational spectral range. The second thickness is equal to half the wavelength of the center wavelength of the operational spectral range plus the same integer multiple of half the wavelength of the longest wavelength in the operational spectral range. As a result, the central layer functions as both a quarter-wavelength-thick low-refractive-index layer for each Bragg mirror, as well as a half-wavelength-thick optical cavity for the Fabry-Perot cavity at all points along the first axis.

In some embodiments, each Bragg mirror includes a pair of quarter-wavelength-thick, low-refractive-index layers located on either side of a quarter-wavelength-thick, high-refractive-index layer and the central layer comprises the high-refractive-index material of the Bragg mirrors.

In some embodiments, the thickness of each of the high- and low-refractive-index layers of each Bragg mirror increases linearly from a thickness equal to a quarter-wavelength of the shortest wavelength in the operating spectral range to a thickness equal to a quarter-wavelength of the longest wavelength in the operating spectral range.

In some embodiments, each Bragg mirror has a different layer structure comprising at least two layers of low-refractive-index material interleaved with at least two layers of high-refractive-index material. In some such embodiments, the thickness of each of the high- and low-refractive-index layers of each Bragg mirror increases linearly from a thickness equal to a quarter-wavelength of the shortest wavelength in the operating spectral range to a thickness equal to a quarter-wavelength of the longest wavelength in the operating spectral range and the central layer is a layer of air having a thickness that increases from a first thickness equal to a half-wavelength of the shortest wavelength in the operating spectral range to a second thickness equal to a half-wavelength of the longest wavelength in the operating spectral range.

In some embodiments, the operating spectral range is other than the MIR spectral range, such as the long-wavelength infrared spectral range, the visible spectral range, or a different spectral range.

In some embodiments, the detector elements include elements other than bolometers, such as semiconductor radiation detectors, mercury-cadmium-telluride detectors, and the like.

In some embodiments, the polymer used as a low-refractive-index material is characterized by a known absorption peak at a specific wavelength. As a result, this absorption peak can be used as an absolute wavelength reference that can be used to calibrate an infrared spectrometer.

In some embodiments, the detector array is a two-dimensional array whose rows are oriented at a slight angle to the longitudinal axis of the spectral filter such that the wavelength signals can be detected with higher resolution.

DETAILED DESCRIPTION

Figure 1:
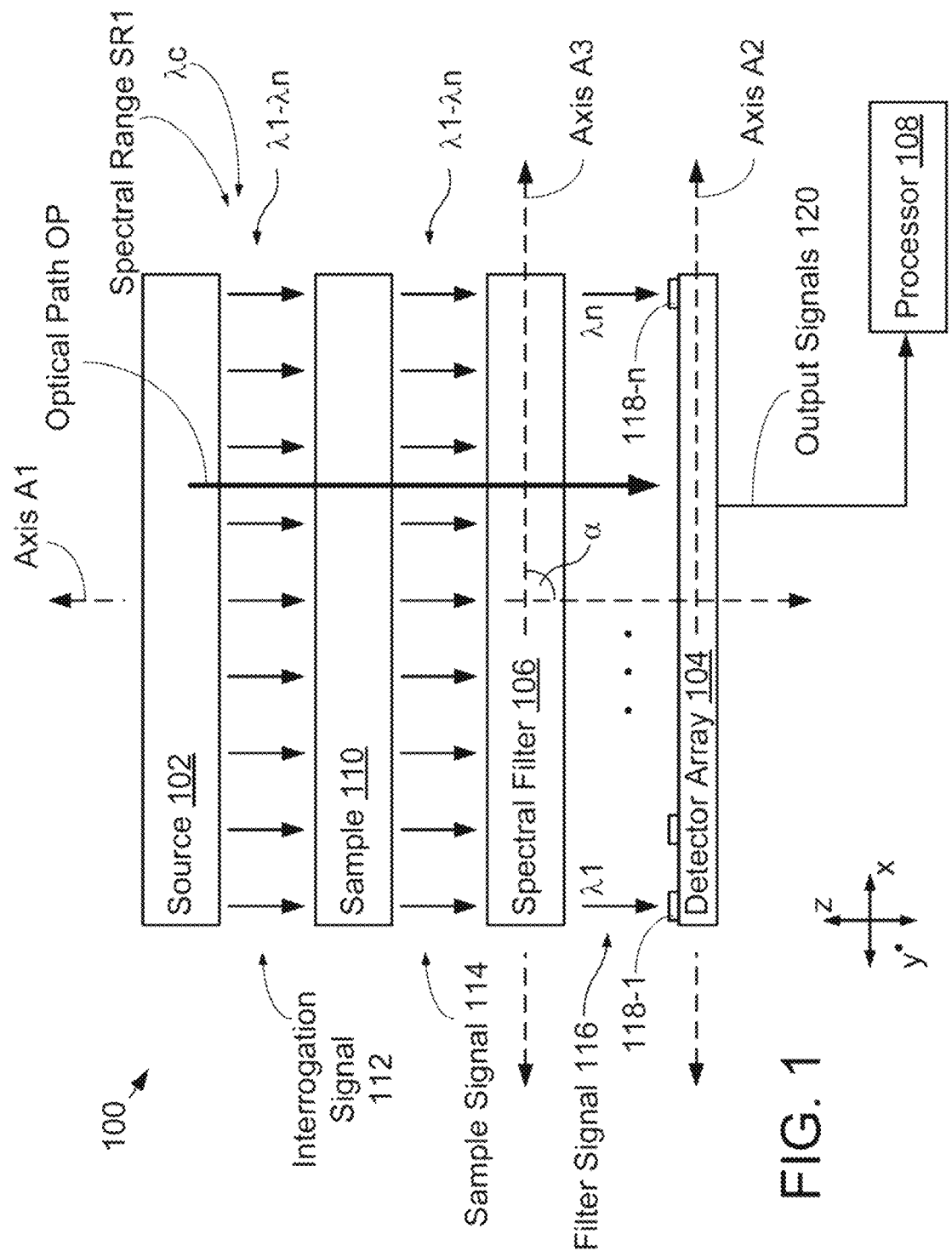
FIG. 1 depicts a schematic drawing of an illustrative embodiment of an infrared spectrometer in accordance with the present disclosure.

FIG. 1 depicts a schematic drawing of an illustrative embodiment of an infrared spectrometer in accordance with the present disclosure. System 100 includes source 102, detector array 104, spectral filter 106, and processor 108.

Source 102 is a conventional radiation source configured to provide interrogation signal 112 to sample 110. In the depicted example, interrogation signal 112 has a spectral range within the range of approximately 2 microns to approximately 20 microns, thereby encompassing portions of each of the MIR and LWIR spectral ranges. Interrogation signal 112 includes wavelength signals $\lambda 1$ through $\lambda n$ and has a spectral width, SR1, and center wavelength $\lambda c$. For the purposes of this Specification, including the appended claims, the term "wavelength signal" is defined as light signal whose spectral content is characterized by a center wavelength and a narrow spectral range that surrounds it. In the depicted example, interrogation signal 112 has a spectral range that spans the wavelengths from approximately 2.5 microns to approximately 16 microns, with center wavelength, $\lambda c$, of approximately 9.0 microns.

Detector array 104 is a linear array of detector elements 118-1 through 118-$n$ (referred to, collectively, as detector elements 118), which are uniformly spaced along axis A2, which is the longitudinal axis of the detector array. Detector elements 118 are operative for detecting the wavelength signals included in interrogation signal 112. Detector elements 118-1 through 118-$n$ provide output signals 120-1 through 120-$n$ (referred to, collectively, as output signals 120), respectively, to processor 108, where the magnitude of each output signal is based on the intensity of the light incident on its respective detector. In the depicted example, each of detector elements 118 is a conventional bolometer. However, in some embodiments, detector array 104 includes a different suitable radiation detector, such as semiconductor detectors, mercury-cadmium-telluride detectors, and the like.

Processor 108 is a conventional processor comprising circuitry operative for receiving output signals 120-1 through 120-$n$, executing instructions, storing and retrieving data, and estimating the material composition of sample 110, among other actions.

Sample 110 is positioned within optical path OP, which is aligned with axis A1 and runs from source 102, through spectral filter 106, to detector array 104. As a result, the radiation provided by the source passes through the sample en route to the detector array. In the depicted example, the interrogating radiation passes through the sample prior to passing through spectral filter 106; however, in some embodiments, this order is reversed. Furthermore, in some embodiments, spectral filter 106 is formed directly on detector array 104.

As interrogation signal 112 passes through sample 110, the absorption characteristics of the sample material is imprinted on the interrogation signal, thereby giving rise to sample signal 114. As a result, signal 114 includes chemistry-dependent spectral information for the material of sample 110. Specifically, the positions, magnitudes, and inflections of the spectral peaks in sample signal 114 provide a "spectral fingerprint" that is subsequently used to estimate the chemical makeup of the sample.

Spectral filter 106 is a Bragg-mirror-based Fabry-Perot (FP) cavity filter configured to receive sample signal 114 from sample 110 and selectively pass its spectral content to detector array 104 as a function of position along the x-direction. In other words, spectral filter 106 provides filter signal 116, which includes wavelength signals $\lambda 1$ through $\lambda n$ such that they are spatially dispersed along the length of the detector array. As a result, each detector element 118-$i$ of detector array 104 selectively receives wavelength signal $\lambda i$, where $1 \leq i \leq n$.

Spectral filter 104 is characterized by longitudinal axis A3, which forms angle $\alpha$ with axis A1. In the depicted example, $\alpha$ is equal to 90° (i.e., light signal propagates along a direction that is normal to spectral filter 106). In some embodiments, axes A1 and A3 are not orthogonal.

Figure 2:
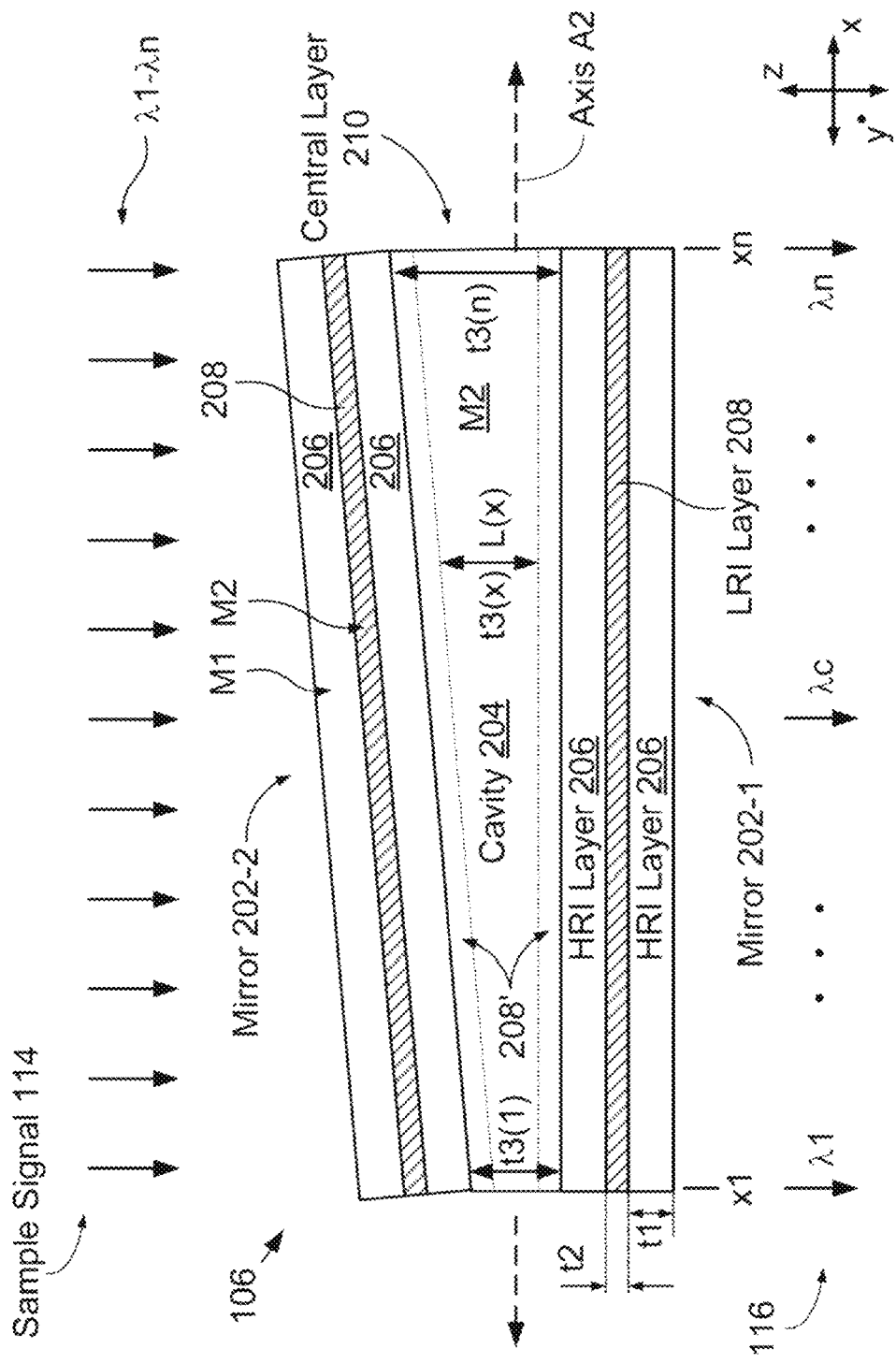
FIG. 2 depicts a schematic drawing of a cross-sectional view of an FP-cavity-based spectral filter in accordance with the illustrative embodiment.

FIG. 2 depicts a schematic drawing of a cross-sectional view of an FP-cavity-based spectral filter in accordance with the illustrative embodiment.

It should be noted that the size of a spectrometer is limited by the propagation length of light in the system, which limits its miniaturization. Furthermore, long propagation lengths require precisely aligned optical elements, such as mirrors and beam splitters, which adds to complexity and manufacturing costs, as well as a need to keep such components carefully aligned. FP-cavity based spectral filters, however, offer an attractive approach for miniaturization and simplification of spectrometers. Light at the resonant frequency is forced to pass through a resonator many times in the optical cavity; therefore, the path-length of photons is multiplied by that number of times.

In an FP-cavity-based spectral filter, a pair of parallel high-reflectivity mirrors are closely spaced to give rise to an optically resonant cavity between them. The separation between the mirrors, referred to as the cavity length of the FP cavity, dictates what wavelengths pass through the cavity and what wavelengths are reflected by the cavity. Light having wavelength, $\lambda$, will resonate back and forth between the mirrors inside the optically resonant cavity when the spacing between the mirrors (i.e., the cavity length, L) is equal to an integer number, m, of half-wavelengths (i.e., when $L=m\lambda/2$) and be transmitted through the cavity with low loss. At the same time, light characterized by other wavelengths will be reflected by the FP cavity. The cavity length, therefore, dictates the wavelength of light selectively passed by the FP cavity.

Spectral filter 106 is a conventional FP-cavity-based device that includes substantially identical Bragg mirrors 202-1 and 202-2 (referred to, collectively, as mirrors 202), which collectively define optically resonant cavity 204 such that the optical cavity has a cavity length, $L(x)$, that is a linear function of position (x) along the x-direction. The linearly increasing cavity length of spectral filter 106 enables it to receive sample signal 114 as a multispectral input optical signal and, at each position (x), selectively pass an output optical signal containing only one narrow wavelength signal included within the spectral range of the multispectral input optical signal sample signal 114.

Each of mirrors 202 includes two high-refractive-index (HRI) layers 206 that are on either side of low-refractive-index (LRI) layer 208.

Each HRI layer 206 is a layer of material M1, which is a relatively higher refractive-index material having substantially uniform thickness, t1, which is equal to an odd-integer multiple of one-quarter of center wavelength $\lambda c$ (within the material of HRI layer 206).

LRI layer 208 is a layer of material M2, which has a relatively lower refractive-index material having substantially uniform thickness, t2, which is also equal to an odd-integer multiple of one-quarter of center wavelength $\lambda c$ (within the material of LRI layer 208).

In the depicted example, each of t1 and t2 is equal to $\lambda c/4$; however, in some embodiments, at least one of t1 and t2 is equal to a different odd-integer multiple of $\lambda c/4$ (e.g., $3\lambda c/4$, $5\lambda c/4$, etc.). Furthermore, in some embodiments, a wavelength other than $\lambda c$ within the spectral range of interrogation signal 112 is used as the reference wavelength upon which thicknesses t1 and t2 are based.

Bragg mirrors 202-1 and 202-2 are separated by central layer 210, which comprises LRI material M2 and has a thickness that increases linearly along the x-direction from x0 to x1.

Central layer 210 is configured such that it functions as both another LRI layer for each of mirrors 202, as well as defining optical cavity 204 of filter 106. In order to perform both of these functions, at each point along the x-direction, the thickness of central layer 210 is equal to an integer number, m, of half-wavelengths (in the depicted example, m=1) of the radiation desired to be passed at that point plus twice thickness t2. In other words, at each point x, central layer 210 includes a portion that defines cavity length $L(x)$ and two portions that each define an equivalent LRI layer 208' for each of mirrors 202.

For example, at position x1, thickness t3 is equal to $2*t2+0.5*\lambda 1$, while at position xn, thickness t4 is equal to $2*t2+0.5*\lambda n$.

In some embodiments, the positions of the high-refractive-index and low-refractive-index layers is reversed, such that each mirror terminates at cavity 204 with an LRI layer 208. In such embodiments, central layer 210 comprises high-refractive-index material and its thickness along the x-direction is commensurate with the wavelength of radiation within the high-refractive-index material.

As would be apparent to one skilled in the art, Bragg reflectors, such as mirror 202, are known to provide excellent high reflectivity and have been widely used for the definition of optical cavities and filters. The reflectivity of these mirrors is typically limited by either scattering or absorption losses of the materials comprising the quarter-wavelength mirror stacks. To minimize scattering losses, layers with smooth interfaces are desired. To reduce absorption losses, materials with limited absorption are typically selected. The wavelength range over which the Bragg mirror efficiently reflects light, or the free spectral range, is determined by the thickness of alternating layers and the contrast in the refractive index between the layers that are selected. In optical cavity filters, large free spectral range and high reflectivities are highly desirable, leading to a preference for transparent materials with high refractive-index contrast.

Unfortunately, in the MIR and LWIR spectral ranges, the choice of transparent materials with large refractive-index contrast is limited. Semiconductors, such as silicon, germanium or zinc selenide are often used as high refractive-index layers, whereas transparent metal fluorides are often used for low index materials. Alternating layers are typically deposited by vacuum techniques to ensure accurate thickness control of the individual layers defining the mirror. However, these deposition techniques are often complex and expensive, and include ion beam deposition, sputter deposition, and epitaxial deposition techniques. Furthermore, these deposition techniques normally require very clean high-vacuum systems. In the MIR and LWIR spectral ranges, the longer wavelengths increase the thicknesses of layers required for growing high quality quarter-wave Bragg mirrors, pushing the stability requirements and deposition time of traditional growth techniques to their limits.

It is an aspect of the present disclosure, however, that certain polymer layers offer an alternative to conventional low-refractive-index materials, reducing the complexity associated with the formation of high-contrast mirrors in the MIR and LWIR spectral ranges. Although polymers have absorption peaks in the MIR and LWIR spectral ranges, careful selection of the polymer can limit the resulting spectral interference to very specific wavelengths. Furthermore, the location of these absorption peaks is absolute; therefore, one or more of the peaks can be used to calibrate the wavelength scale of an infrared spectrometer.

As a result, in sharp contrast to Bragg mirrors known in the prior art, Bragg mirrors in accordance with the present disclosure employ a polymer as LRI material M2. Preferably, material M2 has less than ten absorption peaks within spectral range SR1. For the purposes of this Specification, including the appended claims, an "absorption peak" is defined as a feature in the absorption spectrum of a material at which absorption increases by at least 5%.

In the depicted example, HRI material M1 is germanium and LRI material M2 is polyethyene (PE). The refractive indices of germanium and PE are approximately 4.0 and 1.5, respectively. As a result, thicknesses t1 and t2 are approximately 0.56 microns and approximately 1.5 microns, respectively. Due to their high refractive-index contrast, a Bragg mirror having only two layers of germanium and PE can be expected to provide a reflectivity that exceeds 95%.

Figure 3:
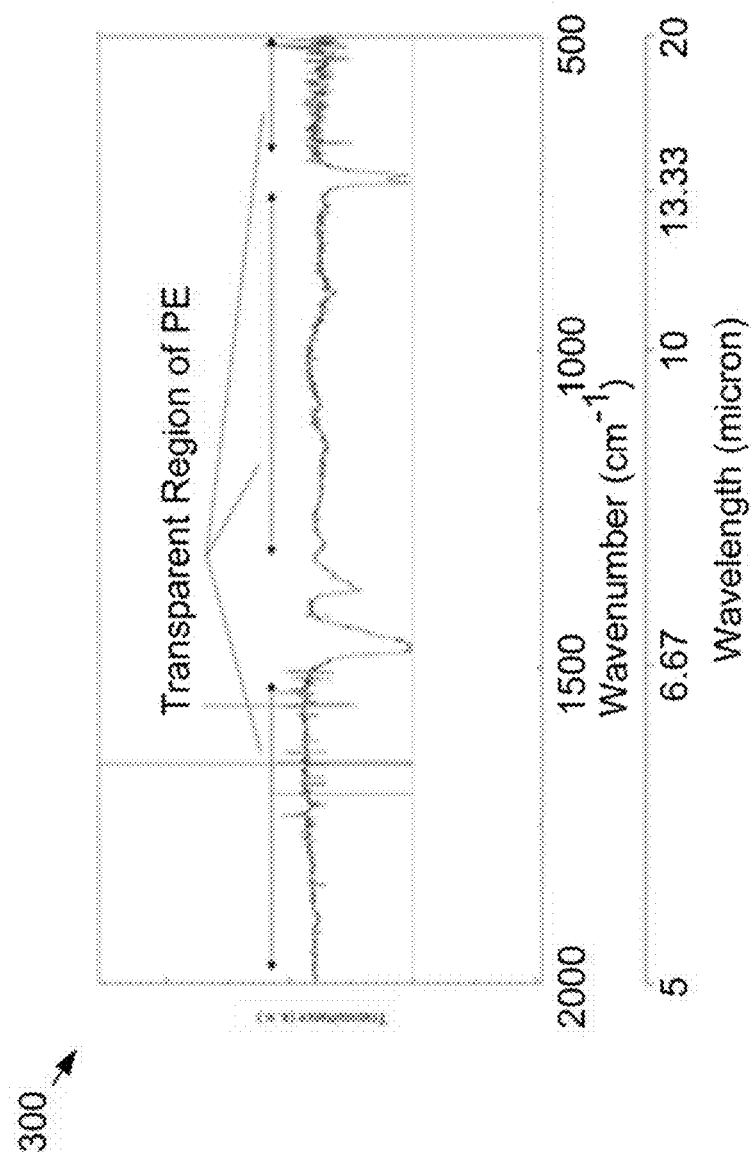
FIG. 3 depicts the transmittance spectrum for polyethylene.
Figure 4A:
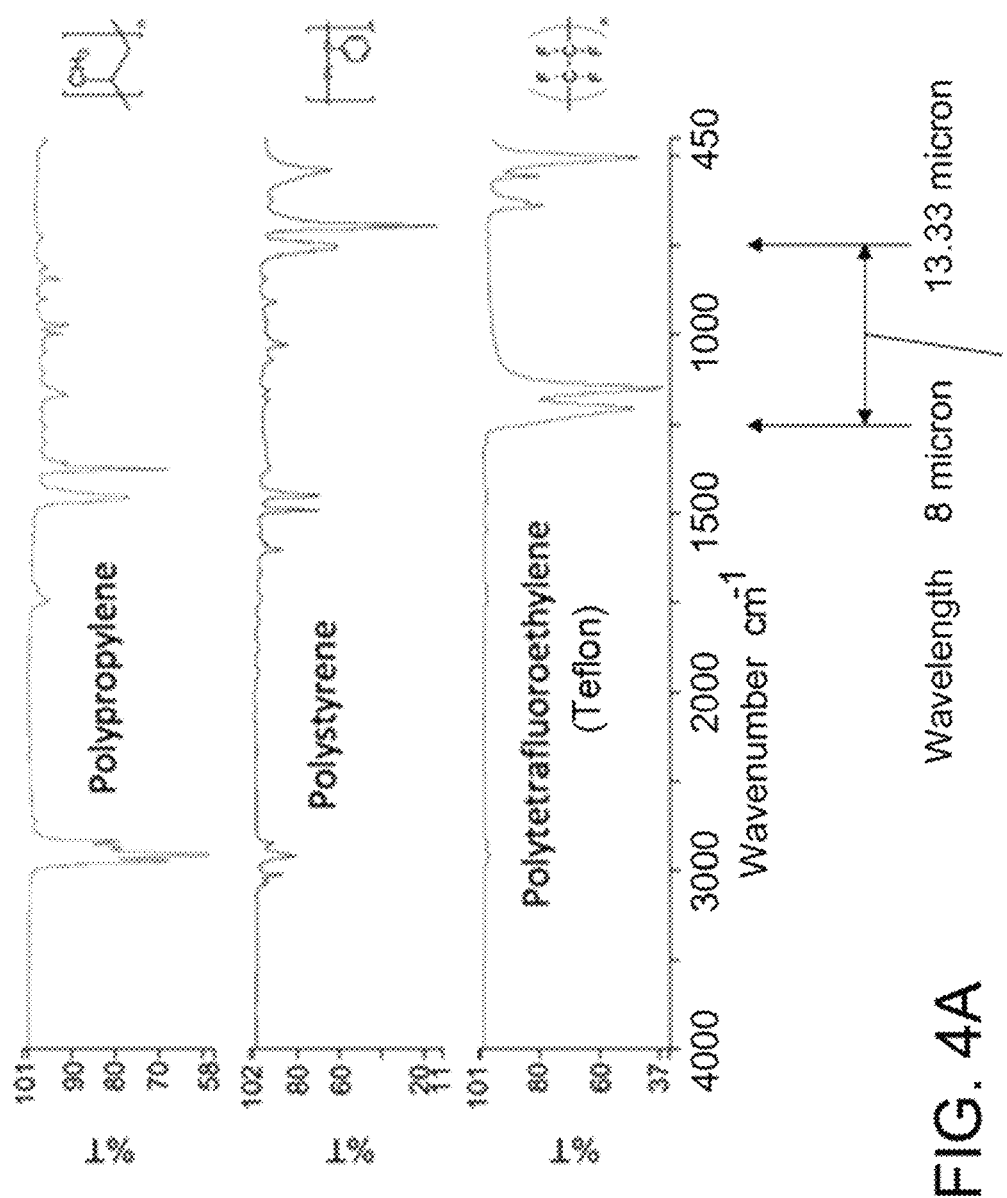
FIGS. 4A-E depict the transmittance spectra for alternative polymers suitable for use in Bragg mirrors in accordance with the teachings of the present disclosure.
Figure 4B:
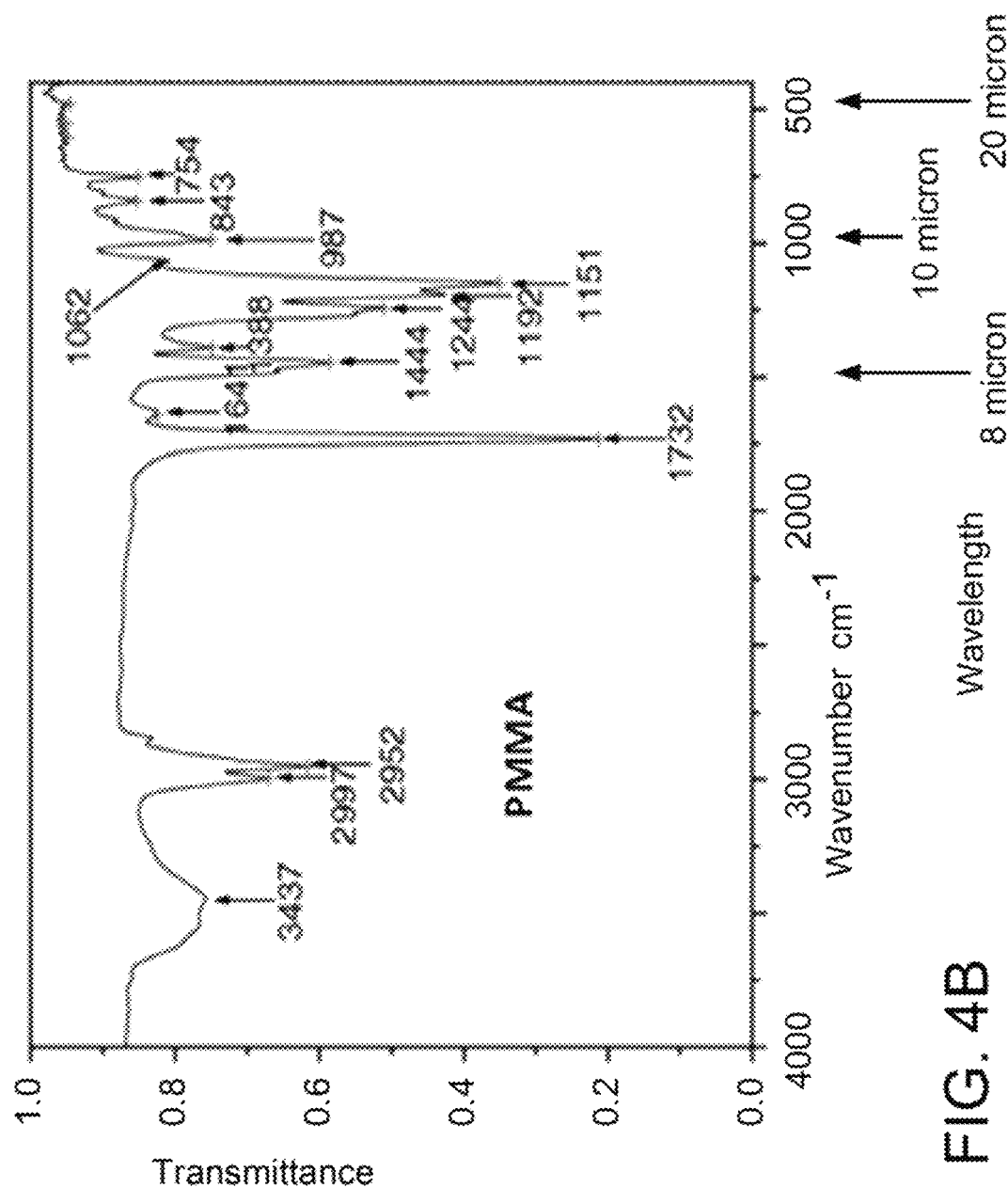
Figure 4C:
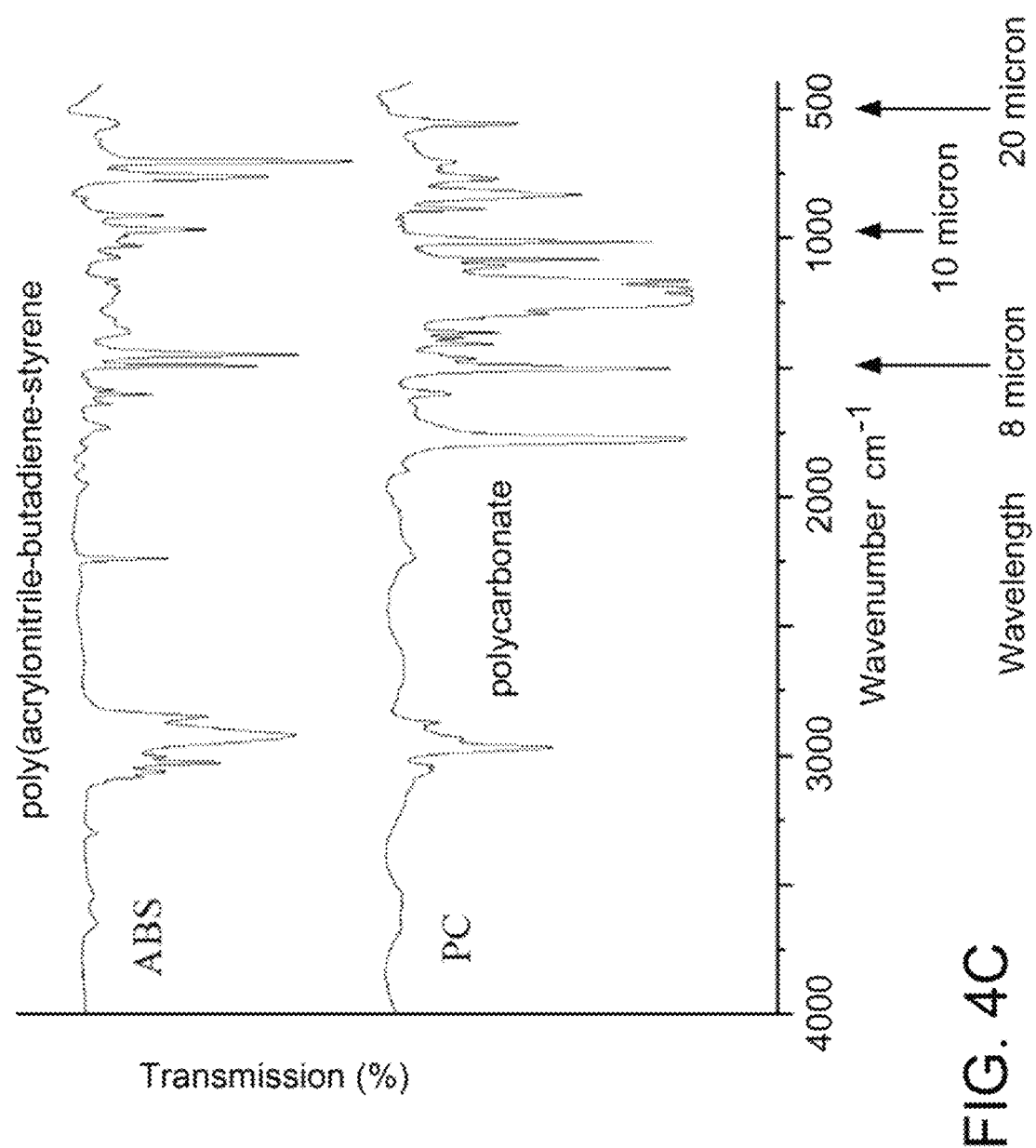
Figure 4D:
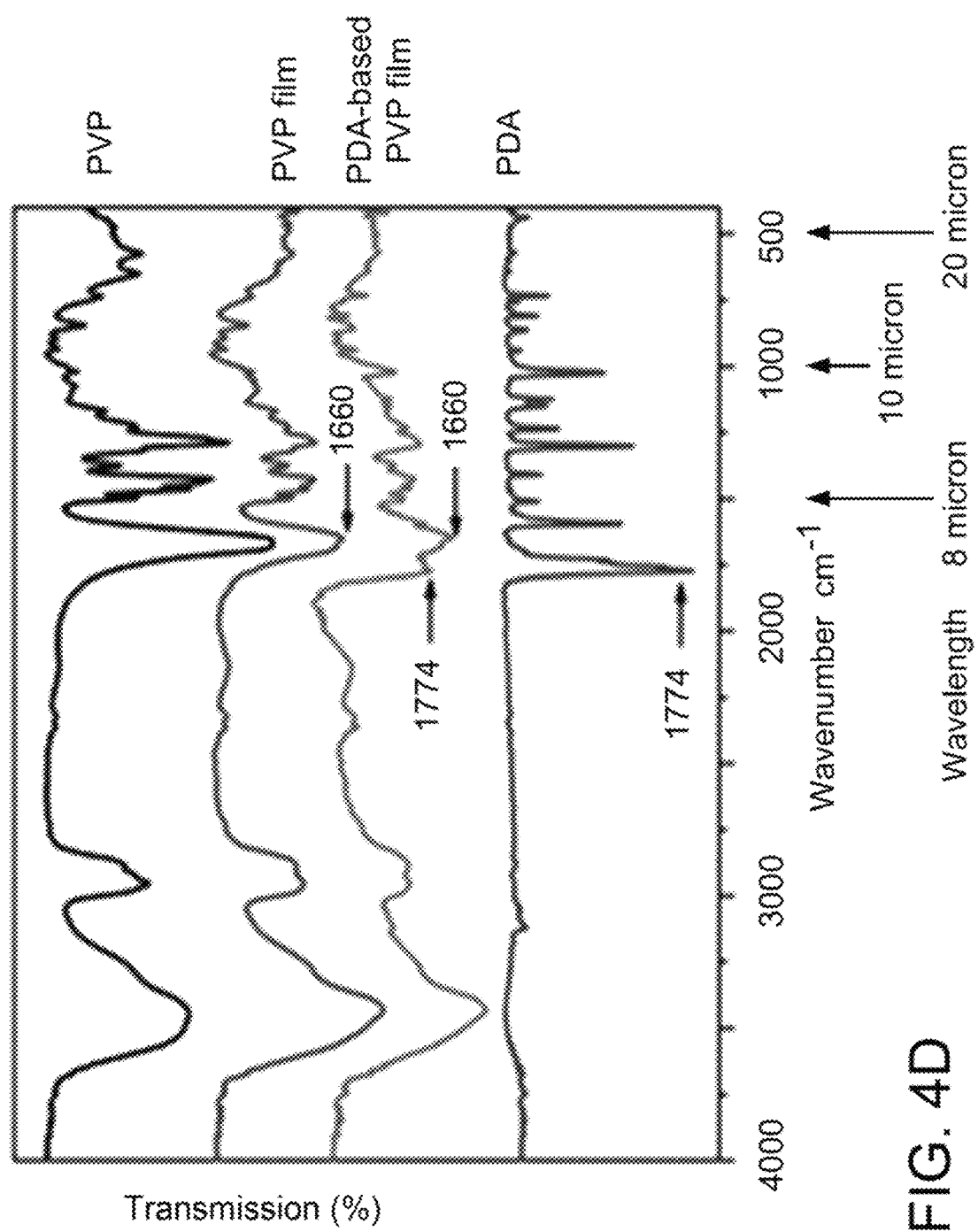
Figure 4E:
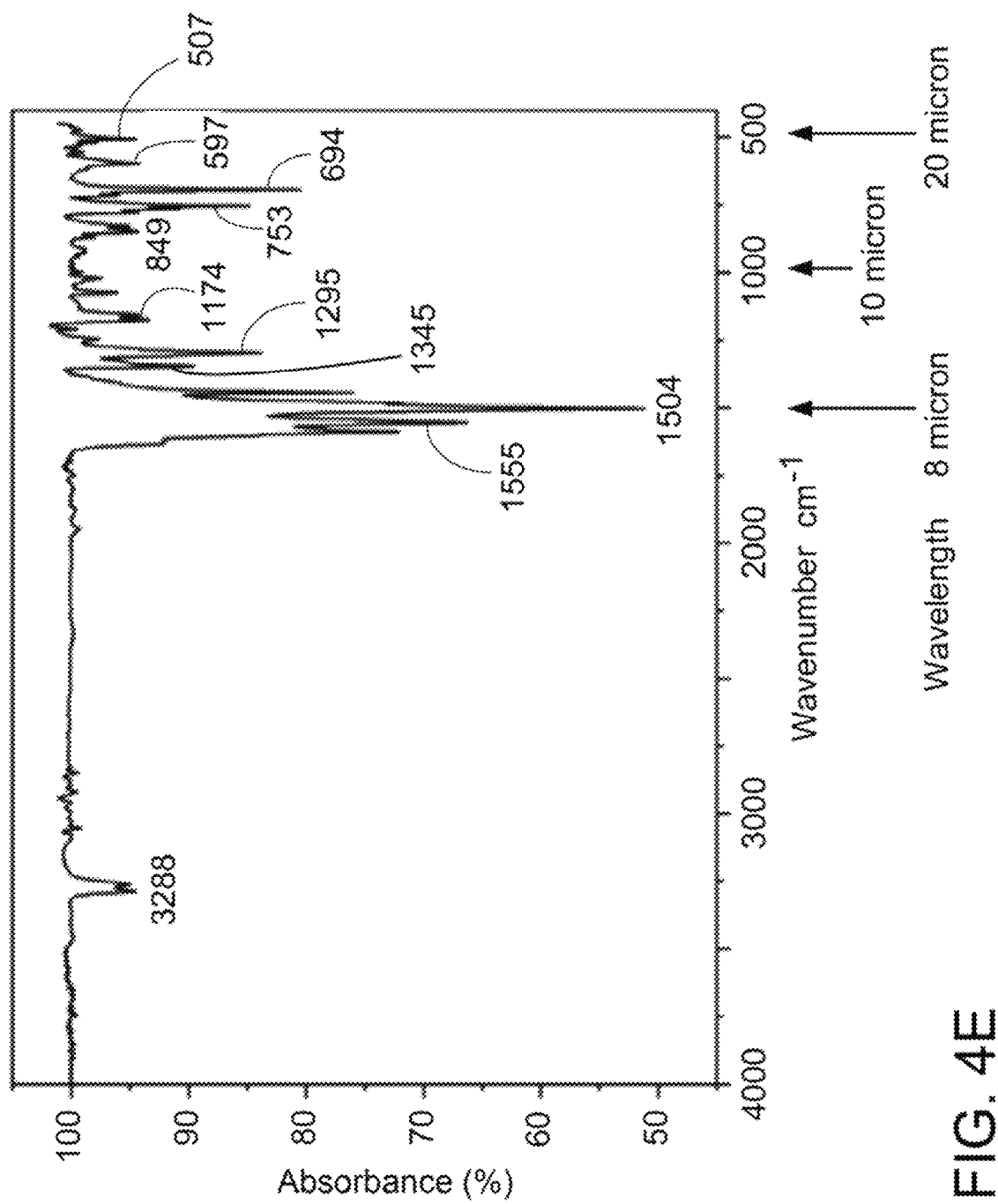

FIG. 3 depicts the transmittance spectrum for polyethylene. Plot 300 shows that PE is highly transmissive over the spectral range from 5.0 microns to 20 microns and is characterized by only three absorption peaks (at 6.83, 7.27, and 13.89 microns) within this range, making it attractive for use in LRI layer 208. Furthermore, the refractive-index contrast between PE and germanium provides each of mirrors 202 with a free spectral range that is large, approximately ranging from 6 to 13 microns.

It should be noted that, although PE is particularly attractive for use as a low-refractive-index material in embodiments in accordance with the present disclosure, a wide range of organic materials having fewer than ten absorption peaks within a spectral range of interest can be used as a low-refractive-index material without departing from the scope of the present disclosure. Materials suitable for use in LRI layer 208 include, without limitation, polypropylene, polystyrene, polytetrafluoroethylene (i.e., Teflon), polymethyl methacrylate (PMMA), poly(acrylonitrile-butadiene-styrene), polycarbonate, polyvinylpyrrolidone (PVP), Polyaniline (emeraldine base) (Pani-EB), and the like.

Furthermore, in some embodiments, LRI layer 208 includes a layer of material M2 that has been altered from its typical state by forming it as a "material foam." For the purposes of this Specification, including the appended claims, the following definitions of terms are provided:

i. the "natural density" of a material is defined as the density of the material when it is in its substantially pure, as-deposited or bulk form without the intentional incorporation of air, vacuum, or inert gas within it;

ii. the "natural refractive index," of a material is defined as the refractive index of the material when it is in its substantially pure, as-deposited or bulk form without the intentional incorporation of air, vacuum, or inert gas within it; and iii. a "material foam" is defined as a material whose density and/or refractive index has been altered from its natural density and/or natural refractive index by the incorporation of a large volume-fraction of one or more of air, vacuum, and inert gas. It should be noted that a material foam based on a polymer is referred to herein as a "polymer foam."

An LRI layer comprising material M2 as a material foam in accordance with the present disclosure can be formed, for example, by vapor depositing material M2 through an inert-gas environment using a vapor-deposition technique such as thermal evaporation, electron-beam (E-beam) evaporation, sputtering, laser deposition, chemical vapor deposition (CVD), atomic-layer epitaxy (ALE), and the like. Alternatively, a material foam layer of material M2 can be formed by co-depositing material M2 and a sacrificial material to form a nascent layer of a composite material, after which, the composite material is subjected to a sacrificial etch that selectively removes the sacrificial material, thereby realizing a highly porous layer of material M2 in which its pores are substantially uniformly distributed.

FIGS. 4A-E depict the transmittance spectra for alternative polymers suitable for use in Bragg mirrors in accordance with the teachings of the present disclosure.

A key advantage of polymer layers is that they can be deposited with excellent thickness control, smooth surfaces and good adhesion by a variety of different techniques. For example, low-temperature vacuum evaporation is an inexpensive alternative to conventional dielectric-mirror deposition techniques.

In fact, evaporation has emerged as a high-volume, high-precision deposition method for organic materials in the manufacture of solar cells, organic light-emitting diodes (OLED), and other devices, thereby promising an ability to scale up to define large areas of high-quality mirrors or filters. Moreover, evaporation enables rapid film deposition with inexpensive equipment. In addition, as discussed below, evaporation can be performed in a manner that advantageously realizes layers having a tapered thickness. Finally, in addition to being able to achieve accurate thickness, evaporation can be used to deposit organic materials directly on the surface of detector array 104, thereby reducing system complexity. It should be noted that, while evaporation is a particularly attractive deposition method for forming LRI layers 208, any suitable deposition technique (e.g., spin coating, chemical-vapor deposition (CVD), sputtering, etc.) can be used without departing from the scope of the present disclosure.

Various methods for forming a layer having a graded thickness are within the scope of the present disclosure.

Figure 5:
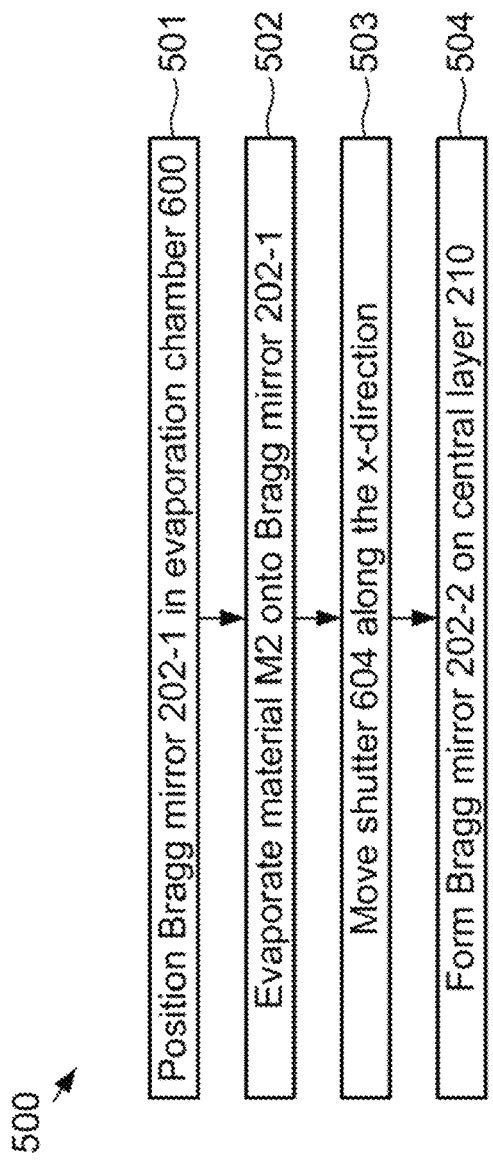
FIG. 5 depicts an exemplary method for forming a spectral filter having a tapered central layer in accordance with the present disclosure.

FIG. 5 depicts an exemplary method for forming a spectral filter having a tapered central layer in accordance with the present disclosure. Method 500 begins with operation 501, wherein Bragg mirror 202-1 is located in evaporation chamber 600.

Figure 6:
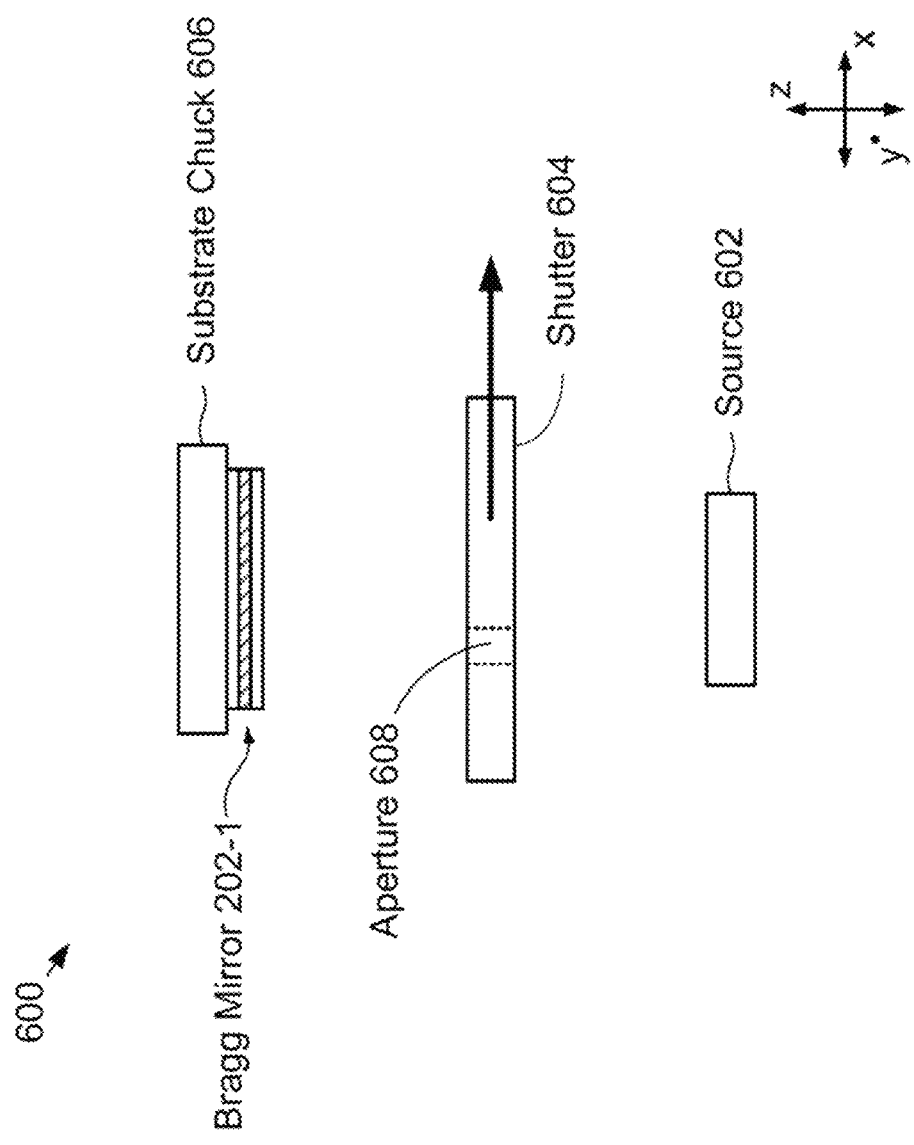
FIG. 6 depicts a schematic drawing of a side-view of an evaporation chamber suitable for forming a tapered layer in accordance with the present disclosure.

FIG. 6 depicts a schematic drawing of a side-view of an evaporation chamber suitable for forming a tapered layer in accordance with the present disclosure. Evaporation chamber 600 includes evaporation source 602, shutter 604, and substrate chuck 606, which are located within a vacuum enclosure (not shown).

Method 500 begins with operation 501, wherein Bragg mirror 202-1 is mounted on substrate chuck 606 within evaporation chamber 600. It should be noted that, in some embodiments, Bragg mirror 202-1 is disposed on a substrate that is substantially transparent for interrogation signal 112.

When positioned within evaporation chamber 600, Bragg mirror 202-1 and evaporation source 602 are on opposite sides of shutter 604 such that material evaporated by the evaporation source must pass through the shutter to deposit on Bragg mirror 202-1.

At operation 502, material M2 is evaporated and deposited on Bragg mirror 202-1 through aperture 608 of shutter 604.

At operation 503, shutter 604 (or, in some embodiments, aperture 608) is controllable moved along the x-direction at a rate that changes linearly. As a result, some regions of the target sample receive evaporated material for longer times than others, giving rise to the desired taper of thickness t(3) and, thereby, forming central layer 210.

It should be noted that operations 502 and 503 represent merely one approach for forming a tapered layer in accordance with the present disclosure. For example, an exemplary alternative method for forming a tapered layer includes evaporating the material of the layer while a wedge (or a series of wedges) is located between the source and the target substrate. As a result, the wedge "shadows" the sample from the deposition source. Since the source has a fixed geometry of millimeters to centimeters in diameter, the shadowing gives rise to a "gray" region in which the deposited thickness has a gradient between the unobstructed region where the sample is fully exposed to the deposited material and the fully shadowed region of the sample where no material is deposited. The gradient geometry can be controlled by controlling the dimensions of the deposition source, the distance between the shadow "mask" and the sample, and the geometry of the deposition source (circular, rectangular, etc.).

Another exemplary alternative method for forming a tapered layer includes depositing a uniform-thickness layer of polymer material and subsequently forming a gray-scale mask on the layer. Etching techniques can then be employed to remove polymer material in a non-uniform manner, where the mask material functions as a sacrificial layer during the etching process.

It should be further noted that methods for forming a tapered central layer in accordance with the present disclosure are also suitable for forming tapered HRI layers 206 and/or tapered LRI layer 208, such as those described below and with respect to FIG. 10.

At operation 504, Bragg mirror 202-2 is formed on central layer 210 to complete spectral filter 106.

Figure 7:
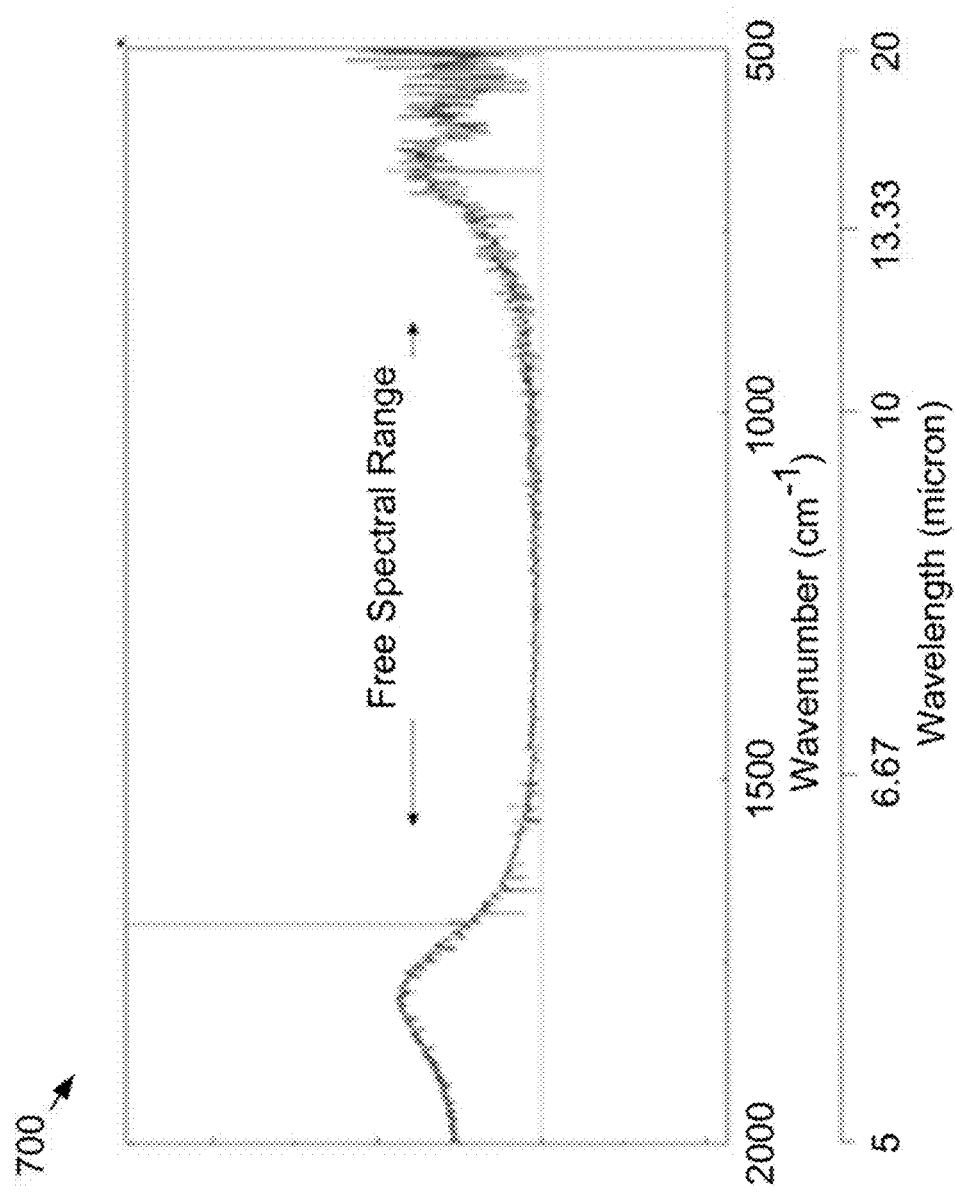
FIG. 7 depicts the spectral response for a Bragg mirror in accordance with the present disclosure.

FIG. 7 depicts the spectral response for a Bragg mirror in accordance with the present disclosure. Plot 700 shows the transmittance for a single Bragg mirror comprising two interleaved pairs of HRI layer 206 and LRI layer 208 as determined using Fourier-transform infrared spectroscopy (FTIR) within the range of 5 microns to 20 microns. Due to the high refractive-index contrast between germanium and PE, it can be seen from plot 700 that such a Bragg mirror has a large free-spectral range that extends from approximately 6 microns to approximately 13 microns.

Figure 8:
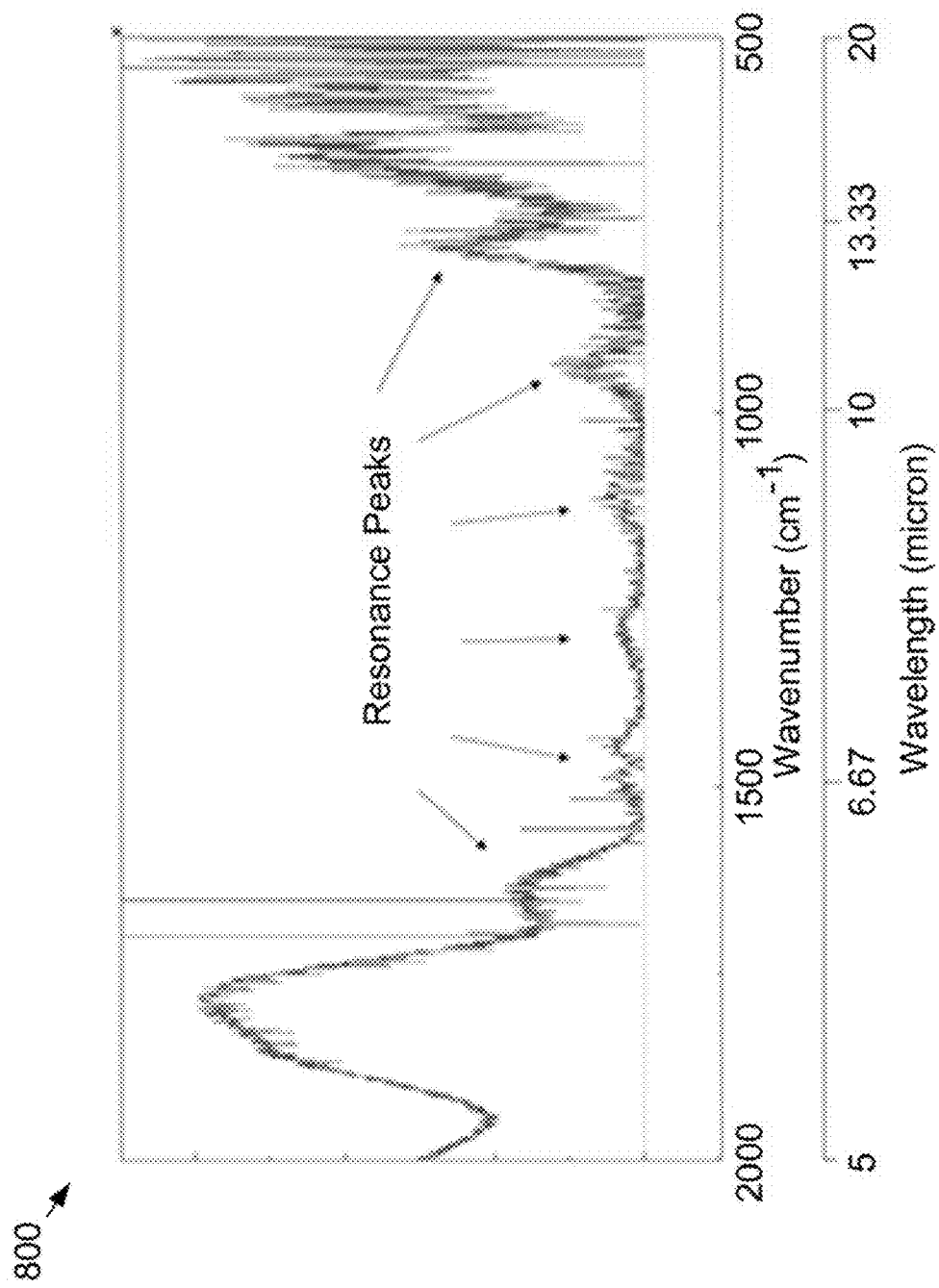
FIG. 8 depicts the transmission spectrum for an FP-cavity based spectral filter in accordance with the present disclosure.

FIG. 8 depicts the transmission spectrum for an FP-cavity based spectral filter in accordance with the present disclosure. Plot 800 shows the transmissivity for a spectral filter that is analogous to filter 106, described above; however, the cavity of the spectral filter is air and it has a uniform cavity length of several wavelengths instead of one-half central wavelength $\lambda c$.

As can be seen from plot 800, because the cavity length of the filter is several wavelengths, multiple resonance peaks can be observed. However, for spectral filter having a cavity length equal to one wavelength (or one-half of a wavelength), its transmission will exhibit only a single resonance peak.

In some embodiments, a two-dimensional detector array is used to receive the wavelength signals provided by spectral filter 106 and sample 110, where the rows of detector elements of the detector array are oriented at a slight angle relative to the longitudinal axis of the spectral filter (i.e., axis A3).

Figure 9:
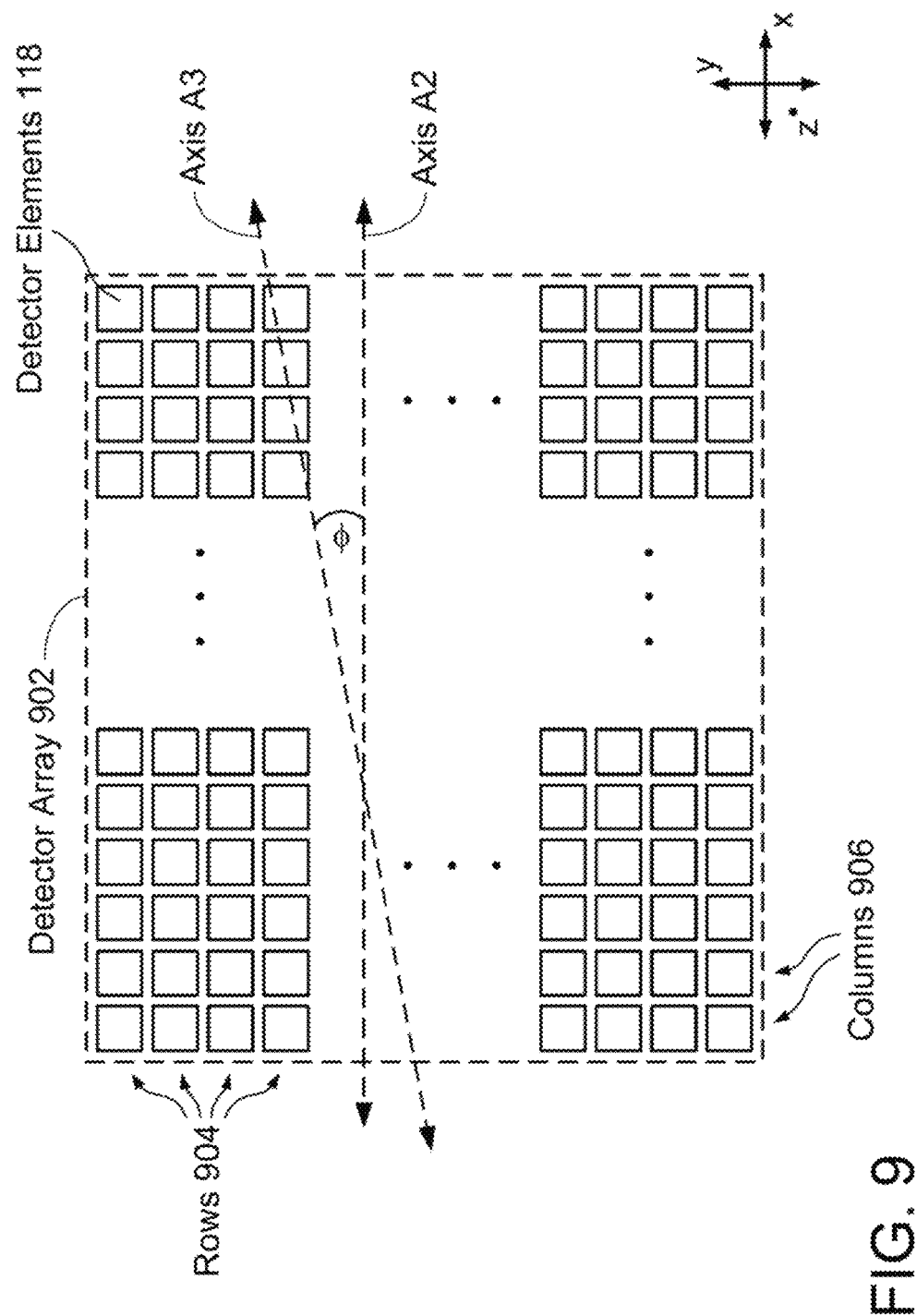
FIG. 9 depicts a schematic drawing of a top view of a high-resolution spectrometer in accordance with the present disclosure.

FIG. 9 depicts a schematic drawing of a top view of a high-resolution spectrometer in accordance with the present disclosure.

System 900 is analogous to system 100; however, system 900 includes detector array 902, which includes a two-dimensional array of detector elements comprising rows 904 and columns 906.

In the depicted example, each of rows 902 is parallel with axis A2.

Detector array 902 is arranged relative to spectral filter 106 such that axes A2 and A3 form angle $\phi$, where $\phi$ is greater than 0° and less than 90°. Typically, $\phi$ is less than a few degrees.

As would be apparent to one skilled in the art, spectral filter 106 spatially disperses the spectral content of sample signal 114 as a continuum along axis A3 and that any line perpendicular to axis A3 contains a linear stripe characterized by substantially the same wavelength. By orienting axes A2 and A3 at a slight angle (i.e., such that $\phi$ is small), therefore, each detector element within a column 906 of detector array 902 receives a slightly different wavelength within the sample signal. As a result, spectrometer 900 can detect the spectral content of sample signal 114 with greater resolution.

Figure 10:
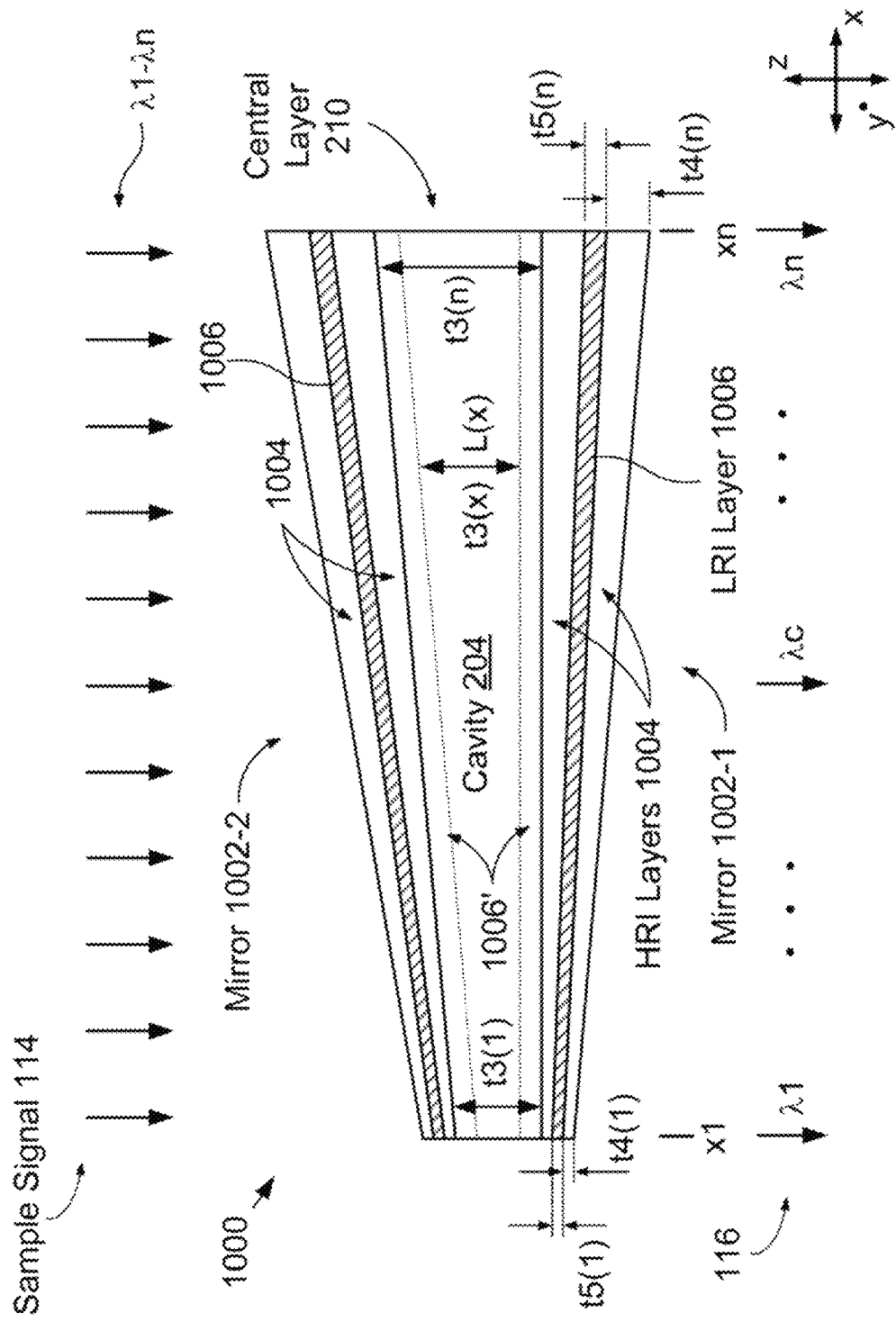
FIG. 10 depicts a schematic drawing of a cross-sectional view of an alternative FP-cavity-based spectral filter in accordance with the present disclosure.

FIG. 10 depicts a schematic drawing of a cross-sectional view of an alternative FP-cavity-based spectral filter in accordance with the present disclosure. Filter 1000 comprises Bragg mirrors 1002-1 and 1002-2, which are separated by cavity 204. Filter 1000 is analogous to filter 106 described above; however, each of the constituent layers of Bragg mirrors 1002-1 and 1002-2 are also tapered along the x-direction such that, at each point (x), the thickness of each of HRI layers 1004 and LRI layers 1006 is equal to a quarter-wavelength of the radiation desired to be transmitted through the filter at that point.

For example, at position x1, each of thicknesses t4(1) and t5(1) is equal to 0.25*$\lambda 1$, while at position xn, each of thicknesses t4(n) and t5(n) is equal to 0.25*$\lambda n$ (where $\lambda$ is the wavelength of the radiation within the material of each layer).

In some embodiments, the positions of the high-refractive-index and low-refractive-index layers in mirrors 1002 is reversed, such that each mirror terminates at cavity 204 with an LRI layer 1006. In such embodiments, central layer 210 comprises high-refractive-index material and its thickness along the x-direction is commensurate with the wavelength of radiation within the high-refractive-index material.

Figure 11:
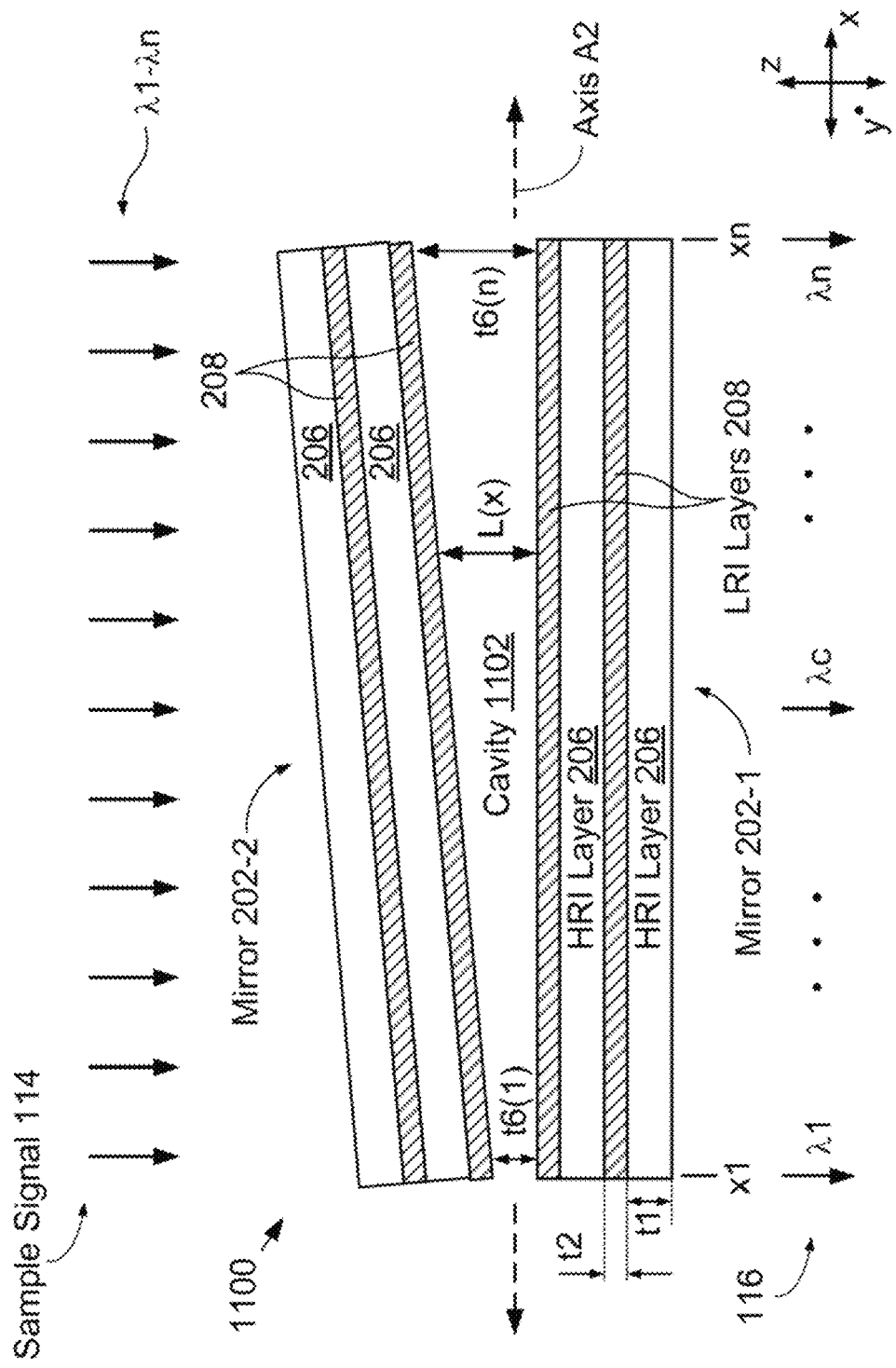
FIG. 11 depicts a schematic drawing of a cross-sectional view of an alternative FP-cavity-based spectral filter in accordance with the present disclosure.

FIG. 11 depicts a schematic drawing of a cross-sectional view of an alternative FP-cavity-based spectral filter in accordance with the present disclosure. Filter 1100 comprises Bragg mirrors 202-1 and 202-2, which are separated by cavity 1102. Filter 1100 is analogous to filter 106 described above; however, mirrors 202 are separated by an air gap that is tapered along the x-direction such that, at each point (x), the filter has a cavity length equal to an integer multiple, m, of one-half the wavelength of the radiation to be transmitted through the filter at that position.

For example, at position x1, thickness t6(1) is equal to 0.5*λ1, while at position xn, thickness t6(n) is equal to 0.5*λn (where λ is the wavelength of the radiation in air).

In some embodiments, the positions of the high-refractive-index and low-refractive-index layers in mirrors 202 is reversed, such that each mirror terminates at cavity 1102 with an LRI layer 208.

In some embodiments, a spectral filter includes a central layer that comprises a polymer that either swells when it absorbs a gas or whose refractive index is affected by absorption of a gas, thereby enabling measurement of a gas concentration by monitoring a shift of the resonance peak of the spectral filter.

Figure 12:
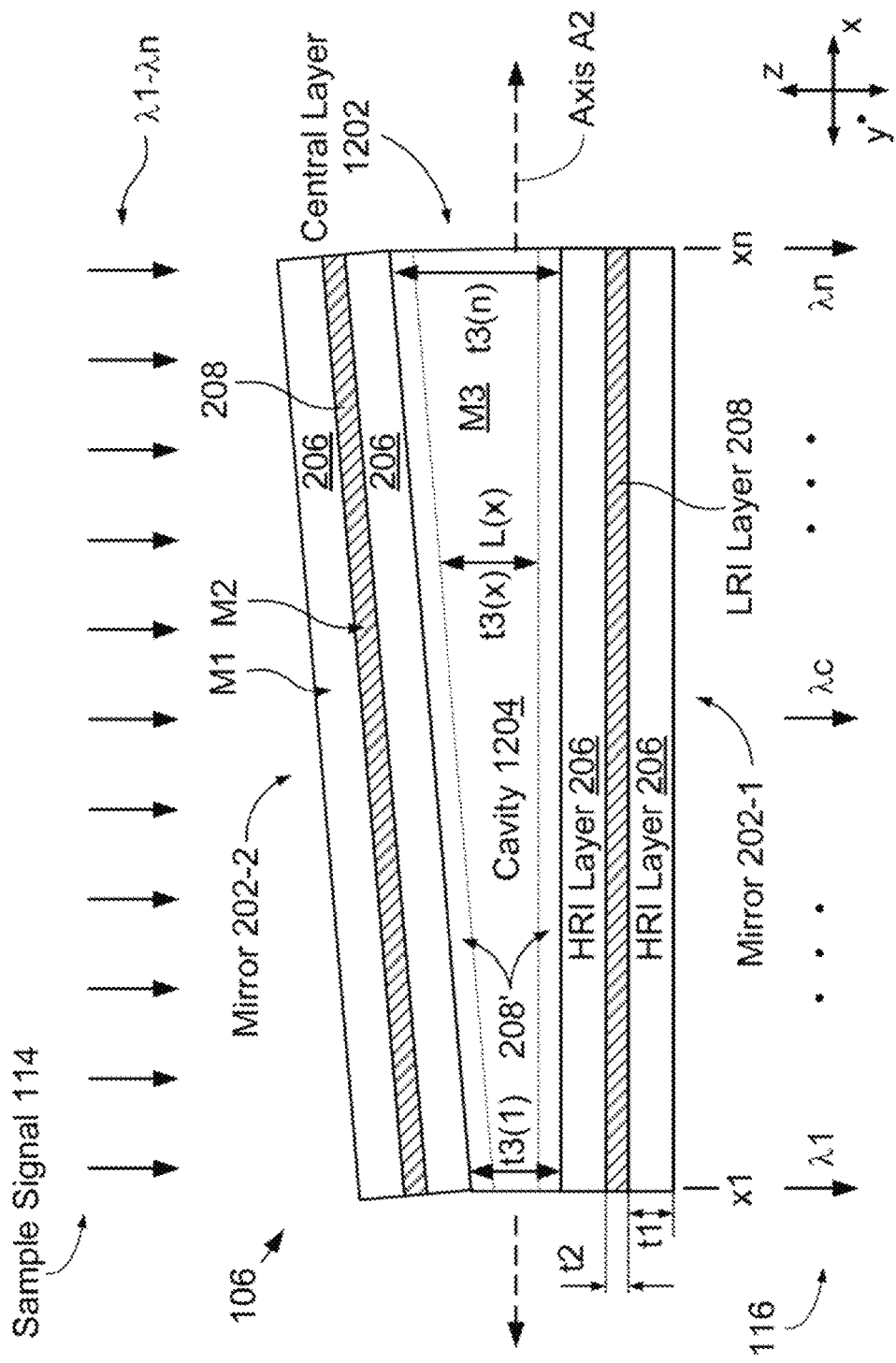
FIG. 12 depicts a schematic drawing of a cross-sectional view of a gas-responsive, FP-cavity-based spectral filter in accordance with the present disclosure.

FIG. 12 depicts a schematic drawing of a cross-sectional view of a gas-responsive, FP-cavity-based spectral filter in accordance with the present disclosure. Filter 1200 includes Bragg mirrors 202-1 and 202-2 and central layer 1202.

Central layer 1202 is analogous to central layer 210; however, central layer 1202 is made of material M3, which is gas-responsive polymer. In the depicted example, material M3 swells when it absorbs a target gas. In some embodiments, the refractive index of material M3 changes when it absorbs a gas.

As would be apparent to one skilled in the art, this swelling of material M3 changes the cavity length across the entire spectral filter. As a result, when exposed to the target gas, the resonant peaks of every wavelength signal in filter signal 116 changes.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising a spectral filter (106), the spectral filter comprising:
   a pair of Bragg mirrors (202-1 and 202-2), each Bragg mirror comprising at least one high-refractive-index (HRI) layer (206) and at least one low-refractive-index (LRI) layer (208), wherein each HRI layer comprises a first material (M1) having a first refractive index, and wherein each LRI layer comprises a second material (M2) that is selected from the group consisting of a polymer and a polymer foam, the second material having a second refractive index that is lower than the first refractive index and being characterized by no more than ten absorption peaks within the first spectral range;
   a central layer (210) disposed between the Bragg mirrors to define an optically resonant cavity (204) for the spectral filter, wherein the central layer has a first thickness (L(x)) that changes linearly along a first longitudinal axis (A3), and wherein the central layer comprises a material selected from the group consisting of the first material, the second material, a third material that is a gas-responsive material (M3), and air;
   wherein the spectral filter is configured to (1) receive a first light signal (114) having a first spectral range that includes a plurality of wavelength signals (λ1 through λn) and (2) provide a second light signal (116) in which the plurality of wavelength signals is spatially dispersed along the first longitudinal axis.

2. The apparatus of claim 1 further comprising:
   a source (102) for providing the first light signal;
   a detector array (104) comprising a plurality of detector elements (118-1 through 118-n), each detector element of the plurality thereof being operative for detecting a different wavelength signal of the plurality thereof;
   wherein the source, spectral filter, and detector array collectively define an optical path (OP) that is configured to pass through a sample (110), and wherein the source, spectral filter, and detector array are arranged such that the detector array receives the plurality of wavelength signals after they have passed through the sample.

3. The apparatus of claim 2 wherein the detector array has a second longitudinal axis (A2), and wherein the first longitudinal axis and second longitudinal axis form an angle (φ) that is greater than zero degrees and less than 90 degrees.

4. The apparatus of claim 1 wherein the polymer is selected from the group consisting of polyethylene, polypropylene, polystyrene, polytetrafluoroethylene, polymethyl methacrylate, poly(acrylonitrile-butadiene-styrene), polycarbonate, polyvinylpyrrolidone, and Polyaniline (emeraldine base).

5. The apparatus of claim 1 wherein each HRI layer has a second thickness (t5) that changes linearly along the first longitudinal axis, and wherein each LRI layer has a third thickness (t6) that changes linearly along the first longitudinal axis.

6. The apparatus of claim 1 wherein the central layer comprises the gas-responsive material and at least one of the thickness and refractive index of the central layer changes when the gas-responsive material absorbs a target gas.

7. The apparatus of claim 1 wherein the second material has a first absorption peak at a first known wavelength that is within the first spectral range.

8. A method comprising:
   providing a spectral filter (106) that includes a central layer (210) disposed between a pair of Bragg mirrors (202-1 and 202-2), each Bragg mirror comprising at least one high-refractive-index (HRI) layer (206) that comprises a first material (M1) that has a first refractive index and at least one low-refractive-index (LRI) layer (208) that comprises a second material (M2) that is selected from the group consisting of a polymer and a polymer foam, the second material having a second refractive index that is lower than the first refractive index and being characterized by no more than ten absorption peaks within the first spectral range, wherein the Bragg mirrors are separated by a central layer (210) that defines an optically resonant cavity (204) for the spectral filter, wherein the central layer has a first thickness t3(x) that changes linearly along a first longitudinal axis (x-direction), and wherein the central layer comprises a material selected from the group consisting of the first material, the second material, a third material that is a gas-responsive material (M3), and air;
   wherein the spectral filter is configured to (1) receive a first light signal (114) having a first spectral range that includes a plurality of wavelength signals (λ1 through λn) and (2) provide a second light signal (116) in which the plurality of wavelength signals is spatially dispersed along the first longitudinal axis.

9. The method of claim 8 wherein providing the spectral filter includes forming the central layer on the first Bragg mirror by evaporating one of the first and second materials through an aperture (608) of a shutter (604) while moving the aperture along the first longitudinal axis at a non-uniform rate.

10. The method of claim 8 wherein providing the spectral filter includes forming the central layer on the first Bragg mirror by operations that include:
positioning a shadow mask in proximity to the first Bragg mirror; and
evaporating one of the first and second materials onto the first Bragg mirror such that that shadow mask shadows the evaporated one of the first and second materials as it deposits on the first Bragg mirror.

11. The method of claim 8 further comprising:
locating the spectral filter and a sample (110) in an optical path (OP) that extends from a source (102) to a detector array (104), the source being configured to provide the first light signal and the detector array being operative for receiving the plurality of wavelength signals;
receiving the second light signal at the detector array;
providing a plurality of output signals (120), each output signal being indicative of the absorption by the sample of a different wavelength signal of the plurality thereof; and
providing a first estimate of the chemical makeup of the sample based on the plurality of output signals.

12. The method of claim 11 further comprising:
providing the detector array such that it includes a two-dimensional array of detector elements (118) that has a plurality of rows (904) and a plurality of columns (906), wherein each row of the plurality thereof is parallel with a second longitudinal axis (A2); and
arranging the spectral filter and the detector array such that the first longitudinal axis and second longitudinal axis form an angle (φ) that is greater than zero degrees and less than 90 degrees.

13. The method of claim 11 wherein the spectral filter is provided such that the second material has a first absorption peak at a first known wavelength that is within the first spectral range, and wherein the method further comprises calibrating a wavelength scale of the detector array based on the first wavelength peak.

14. The method of claim 8 wherein polymer is selected from the group consisting of polyethylene, polypropylene, polystyrene, polytetrafluoroethylene, polymethyl methacrylate, poly(acrylonitrile-butadiene-styrene), polycarbonate, polyvinylpyrrolidone, and Polyaniline (emeraldine base).

15. The method of claim 8 further comprising forming a first layer via spin coating, wherein the first layer is an HRI layer or an LRI layer.

16. An apparatus comprising a spectral filter (106), the spectral filter comprising:

a pair of Bragg mirrors (202-1 and 202-2), each Bragg mirror comprising at least one high-refractive-index (HRI) layer (206) and at least one low-refractive-index (LRI) layer (208), wherein each HRI layer comprises a first material (M1) having a first refractive index, and wherein each LRI layer comprises a second material (M2) having a second refractive index that is lower than the first refractive index and being characterized by no more than ten absorption peaks within the first spectral range;
a central layer (210) disposed between the Bragg mirrors to define an optically resonant cavity (204) for the spectral filter, wherein the central layer has a first thickness (L(x)) that changes linearly along a first longitudinal axis (A3), and wherein the central layer comprises a material that is a gas-responsive material (M3) such that at least one of the thickness and refractive index of the central layer changes when the gas-responsive material absorbs a target gas;
wherein the spectral filter is configured to (1) receive a first light signal (114) having a first spectral range that includes a plurality of wavelength signals (λ1 through λn) and (2) provide a second light signal (116) in which the plurality of wavelength signals is spatially dispersed along the first longitudinal axis.

17. The apparatus of claim 16 wherein the second material is a material selected from the group consisting of a polymer and a polymer foam, and wherein the polymer is selected from the group consisting of polyethylene, polypropylene, polystyrene, polytetrafluoroethylene, polymethyl methacrylate, poly(acrylonitrile-butadiene-styrene), polycarbonate, polyvinylpyrrolidone, and Polyaniline (emeraldine base).

18. The apparatus of claim 16 wherein the second material has a first absorption peak at a first known wavelength that is within the first spectral range.

19. The apparatus of claim 16 further comprising:
a source (102) for providing the first light signal; and
a detector array (104) comprising a plurality of detector elements (118-1 through 118-n), each detector element of the plurality thereof being operative for detecting a different wavelength signal of the plurality thereof;
wherein the source, spectral filter, and detector array collectively define an optical path (OP) that is configured to pass through a sample (110), and wherein the source, spectral filter, and detector array are arranged such that the detector array receives the plurality of wavelength signals after they have passed through the sample.

20. The apparatus of claim 19 wherein the detector array has a second longitudinal axis (A2), and wherein the first-longitudinal axis and second longitudinal axis form an angle (φ) that is greater than zero degrees and less than 90 degrees.

* * * * *